United States Patent
Lum et al.

(10) Patent No.: US 6,341,307 B1
(45) Date of Patent: *Jan. 22, 2002

(54) INTERFACE CODE ARCHITECTURE

(75) Inventors: Lambert Chun-Bob Lum, Hayward; Craig Seidel, Palo Alto; Zhengo (Mark) Guan, Mountain View, all of CA (US); James K. Schwarz, Jr., Boulder, CO (US)

(73) Assignee: Electronics for Imaging, Inc., Foster City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/495,289

(22) Filed: Jan. 31, 2000

Related U.S. Application Data (63) Continuation of application No. 08/933,126, filed on Sep. 18, 1997, now Pat. No. 6,065,041.

(51) Int. Cl.$^7$ ............................................. G06F 15/177
(52) U.S. Cl. ...................................... 709/220; 709/203
(58) Field of Search ................................ 709/203, 220, 709/221, 222, 230, 246; 345/330, 502, 334, 329, 335, 326, 700, 733, 762, 764, 781, 864, 3.1

(56) References Cited

U.S. PATENT DOCUMENTS

| | | | | | |
|---|---|---|---|---|---|
| 4,558,413 | A | * | 12/1985 | Schmidt et al. | 707/203 |
| 4,787,035 | A | * | 11/1988 | Bourne | 700/247 |
| 4,860,247 | A | * | 8/1989 | Uchida et al. | 345/502 |
| 5,045,994 | A | * | 9/1991 | Belfer et al. | 703/25 |
| 5,289,574 | A | | 2/1994 | Sawyer | 395/157 |
| 5,315,711 | A | * | 5/1994 | Barone et al. | 709/208 |
| 5,327,529 | A | | 7/1994 | Fults et al. | 395/155 |
| 5,388,252 | A | * | 2/1995 | Dreste et al. | 714/46 |
| 5,539,872 | A | * | 7/1996 | Mintz et al. | 345/326 |
| 5,715,444 | A | * | 2/1998 | Danish et al. | 707/4 |
| 5,734,852 | A | * | 3/1998 | Zias et al. | 345/334 |
| 5,748,189 | A | * | 5/1998 | Trueblood | 370/235 |
| 5,768,614 | A | * | 6/1998 | Takagi et al. | 710/1 |
| 5,815,148 | A | * | 9/1998 | Tanaka | 345/335 |
| 5,854,936 | A | * | 12/1998 | Pickett | 717/10 |
| 5,883,613 | A | * | 3/1999 | Iwaki | 345/132 |
| 5,897,635 | A | * | 4/1999 | Torres et al. | 707/10 |
| 5,950,011 | A | * | 9/1999 | Albrecht et al. | 717/11 |
| 6,065,041 | A | * | 5/2000 | Lum et al. | 709/203 |

FOREIGN PATENT DOCUMENTS

| | | | |
|---|---|---|---|
| EP | 0333612 | 9/1989 | G06F/9/44 |
| EP | 0684547 | 11/1995 | G06F/3/14 |
| WO | WO95/15524 | 6/1995 | G06F/9/445 |

\* cited by examiner

*Primary Examiner*—Mehmet B. Geckil
(74) *Attorney, Agent, or Firm*—Michael A. Glenn (57) ABSTRACT

A display interface system that uses a server-client approach. The server contains all of the necessary information regarding display information, while the client deals with the specific display type that it is connected to. The server contains generic descriptions of user interface screens which allow the server to be independent of specific display types. This allows one version of software to support many types of displays, rather than several software revisions for each display type, saving the software developer time, maintenance, and labor costs. A request-response communication system is used whereupon the client requests previous or next user display screens, system parameter requests, or updates from the server. The client requests screen information through a series of key-tag sequences, while the server controls the sequencing of the user display screens. The client is shielded from any knowledge of the contents of the screen and is only concerned with the fact that something is being displayed. Communication between the server and client is through a unified protocol, allowing the client to be located either locally, in the same machine or remote, across a network.

56 Claims, 7 Drawing Sheets

INTERFACE CODE ARCHITECTURE

This application is a continuation of U.S. patent application Ser. No. 08/933,126, filed Sep. 18, 1997 now U.S. Pat. No. 6,065,041.

BACKGROUND OF THE INVENTION

1. Technical Field

The invention relates to the transfer of information across a plurality of dissimilar display devices. More particularly, the invention relates to a generic information interface architecture for transferring display information from a server to a plurality of dissimilar display devices, thereby allowing the server to ignore the attributes of each particular display device.

2. Description of the Prior Art

Computer system applications that require user interaction communicate information through devices such as Liquid Crystal Displays (LCDs), Light Emitting Diode (LED) displays, plasma displays, and cathode ray tubes (CRTs). Each display type requires a specialized driver to control any graphical representations on the display. The graphical representations may be very simple, one-line messages, e.g. "Self Test," to very complicated graphical user interfaces (GUIs).

A software developer must create source code that is custom tailored for each display with which his application communicates. Typically, a library is created that represents all of the allowable graphic primitives on the screens that are displayed on the chosen display. The library contains information such as the screen creation primitives, button labels, user messages, blink characteristics, and headings. Built on top of the library is a module containing all of the screen descriptions. The library and screen description module are written in the programming language, e.g. "C," that the software developer is using and customized for the type of display, e.g. a one, two, or five-line LCD display, or a GUI display. The differences between a two-line and a five-line LCD display is the amount of information that can be displayed. A two-line LCD display is limited in the amount of text that can be displayed to the user as compared to a five-line LCD display. A GUI display has much more display area than a line-limited LCD display. It can display on one screen, information that would require several screens on a line-limited LCD display. The source code is then compiled with the application source code and delivered as part of the final product.

This hard coding of display screens requires that new source code be created and compiled into the application software whenever a new display device is selected. The source code for each display type must be archived and maintained for the life of each display device. This is a cumbersome and expensive task, e.g. there are N different source codes for N different display devices used.

U.S. Pat. No. 4,787,035 issued to Bourne on Nov. 22, 1988, discloses a system which uses an interpreter that examines messages using grammar and lexical tables to produce a parse table. The parse table is compared to data needed in a semantics table to fire a rule which causes a function table to be evaluated and performs user desired functions. This is particularly suitable for manufacturing systems with multiple target languages.

If the product is one that is used by an Original Equipment Manufacturer (OEM), the OEM usually requires custom displays to differentiate their product from the other OEMs using the same base application. For an OEM engineer to create his custom displays, he must know the internal structure of the application's software. Revealing such information is many times a sensitive issue. The originating company would prefer to keep such internal software structures confidential in an attempt to retain their value as a product supplier to any OEM.

It would be advantageous to provide a display interface system that allows the developer to create a single set of screen descriptions that is used for all supported display types. It would further be advantageous to provide a display interface system that is independent of the display location, i.e. whether the display is embedded in the system or network accessible.

SUMMARY OF THE INVENTION

The invention provides a display interface system that has a generic architecture and is thereby independent of the supported display type. The invention uses a generic language approach that is independent of the type of display chosen and its location in relation to the generic code generator.

The invention uses a server-client approach. The server contains all of the necessary information regarding display information, while the client deals with the specific display type to which it is connected. The server allows a software developer to create generic descriptions of user interface screens. The generic screen descriptions allow the server to be independent of specific display types. This allows one version of software to support many types of displays, rather than several software versions for each display type. The software developer saves on time, maintenance, and labor costs.

A request-response communication system is used whereupon the client, acting as the user interface, requests previous or next user display screens, system parameter requests or updates from the server. Thus, the user interface function is offloaded from the server. The client requests screen information through a series of key-tag sequences. User display screen sequencing is controlled by the server. The concept of user display screens is known only to the server. The client is shielded from any knowledge of the contents of the screen and is only concerned with the fact that something is being displayed.

Communication between the server and client is through a unified protocol. The server-client approach, combined with the unified protocol, allows the client to be located either locally, in the same machine or remotely, across a network.

DETAILED DESCRIPTION OF THE INVENTION

Figure 1:
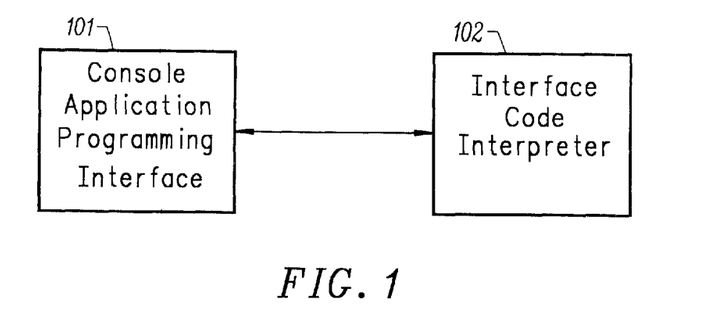
FIG. 1 is a block schematic diagram of two major components and their interface according to the invention.

FIG. 1 shows a Console Application Programming Interface (CAPI) 101 and an Interface Code Interpreter 102 which comprise two major components of the invention. The CAPI 101 allows a software developer to create generic descriptions of user interface screens or portions of user interface screens, collectively referred to as "screens". These descriptions are then managed by CAPI 101 during normal system run-time. A request-response communication system is used whereupon the Interface Code Interpreter 102, acting as the direct user interface, requests previous or next in sequence user display screens from CAPI 101. CAPI 101 controls the sequencing of all of the user display screens. The concept of user display screens is known only to CAPI 101. The Interface Code Interpreter 102 only has the knowledge that something is being displayed to the user, and not the content of the display.

Figure 2:
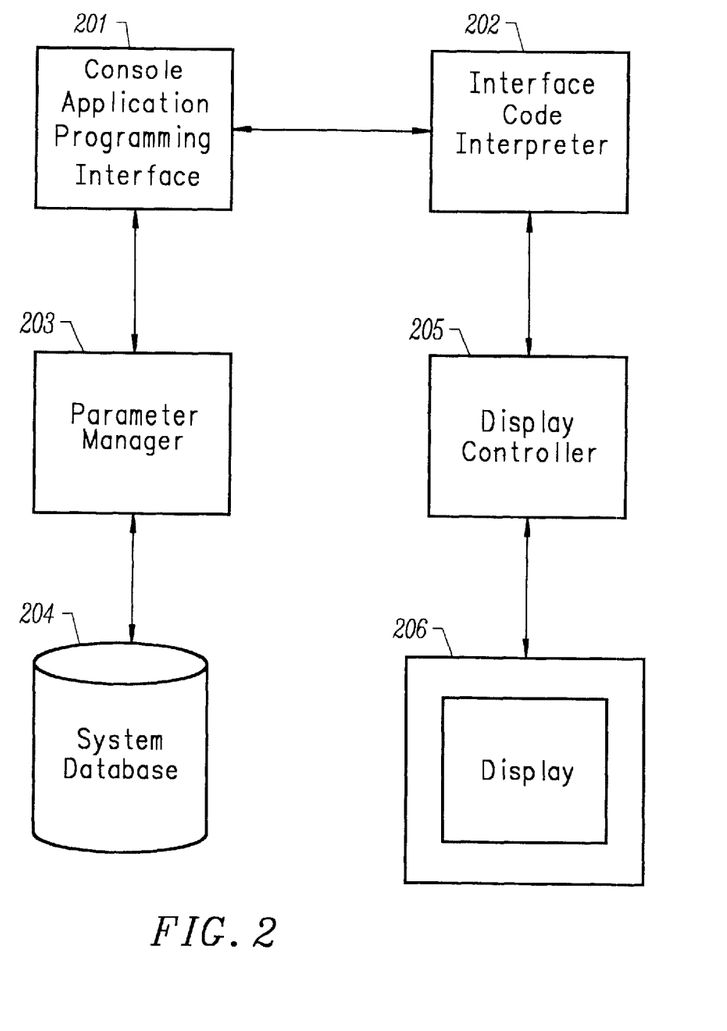
FIG. 2 is a block schematic diagram of a full system implementation according to the invention.

With regard to FIG. 2, to explain the capabilities of the invention further, CAPI 201 and the Interface Code Interpreter 202 are shown in a full system implementation. A Parameter Manager 203 is the interface to all of the system information, e.g. how many print jobs are queued on the system, or the Internet Protocol (IP) address. This information is stored in the System Database 204 and accessed by the Parameter Manager 203. The Interface Code Interpreter 202 sends a value request or a value save request to CAPI 201. CAPI 201 asks the Parameter Manager 203 for the appropriate value from the System Database 204, in the case of a value request, and sends the value response back to the Interface Code Interpreter 202. In the case of a value save request, CAPI 201 has the Parameter Manager 203 check the validity of the value and then update the appropriate value in the System Database 204. The Interface Code Interpreter 202 communicates with the user through the Display Controller 205. The Display Controller 205 consequently displays information to the user through the Display 206.

Figure 3:
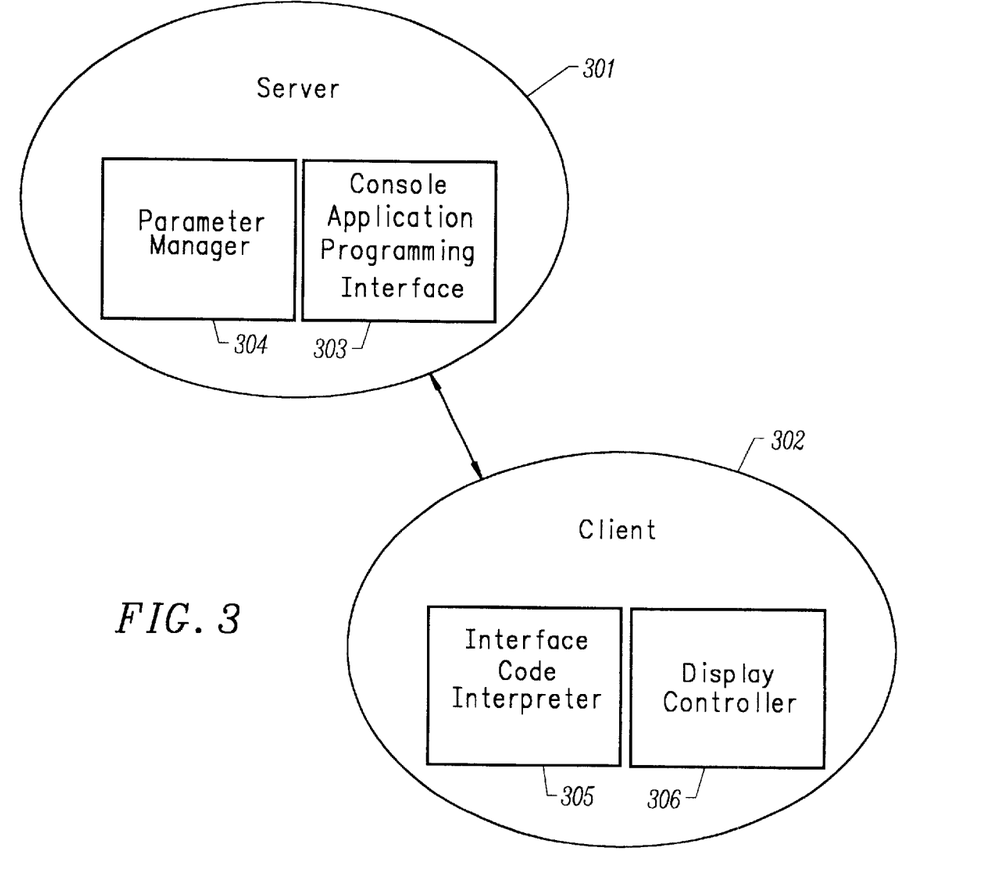
FIG. 3 is a block schematic diagram of a server client relationship according to the invention.

Referring to FIG. 3, the invention is extended to a server-client relationship. The Server 301 contains the CAPI 303 and Parameter Manager 304 components. The Client 302 contains the Interface Code Interpreter 305 and Display Controller 306 components. The Server 301 and Client 302 communicate with each other using the CAPI 303 and Interface Code Interpreter 305. The Parameter Manager 304 and CAPI 303 may be combined together as one functional component and will herein be referred to as CAPI. In this embodiment of the invention, the client may communicate with the server after a selected action is executed locally at the client (default mode), or client/server communication may occur in a direct mode, in which certain user actions are communicated directly to the server, or in a component level event driven mode, in which all user actions are communicated directly to the server.

Figure 4:
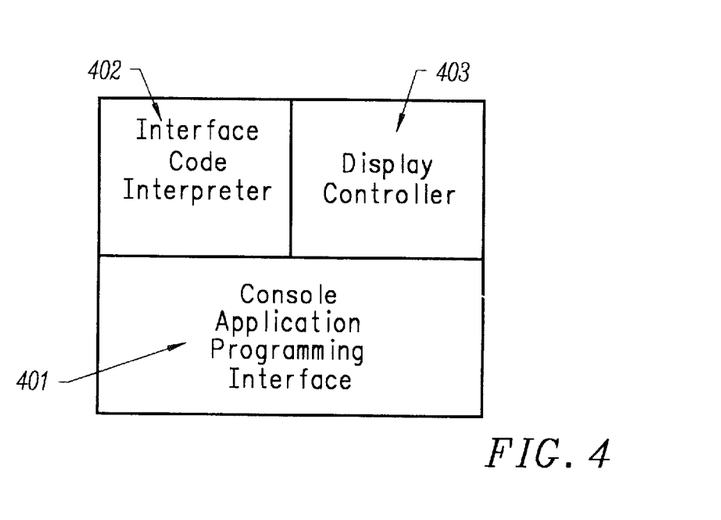
FIG. 4 is a block diagram showing a localized implementation according to the invention.

Referring to FIG. 4, in a local implementation, the CAPI 401, Interface Code Interpreter 402, and Display Controller 403 are combined together, thereby providing an integrated user interface solution.

Figure 5:
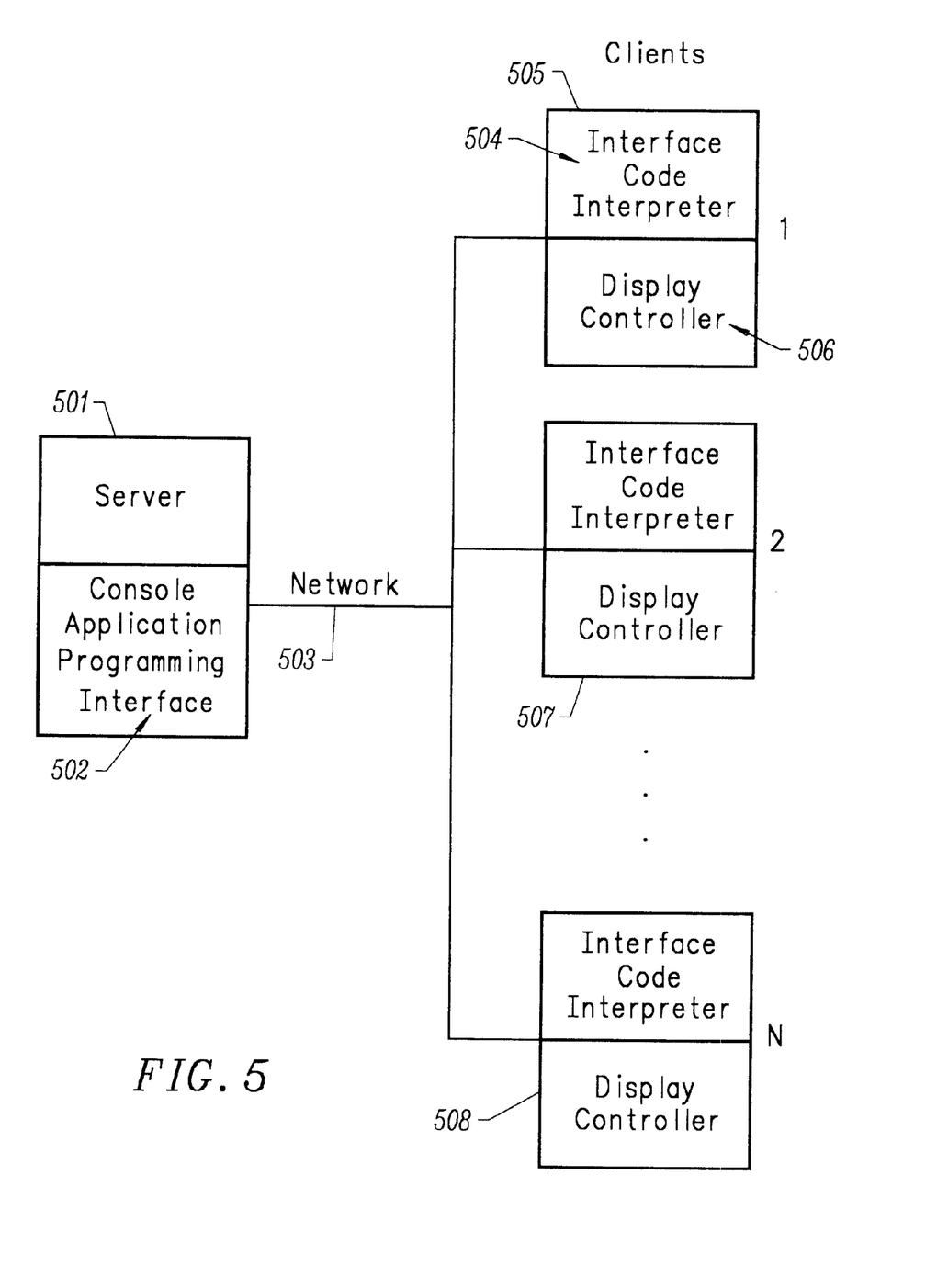
FIG. 5 is a block schematic diagram showing a remote implementation utilizing the server-client relationship according to the invention.

With respect to FIG. 5, a network implementation is shown. The Server 501 contains the CAPI 502 component. Clients communicate with the Server 501 through a Network 503. There may be any number of clients one 505, two 507, through N 508 attached to the network. Each client contains the Interface Code Interpreter 504 and Display Controller 506 components. The Interface Code Interpreter 504 varies from one client to another depending on the capabilities of the display type. All requests for user interface screens are sent from the clients through the Network 503, to the Server 501.

Figure 6:
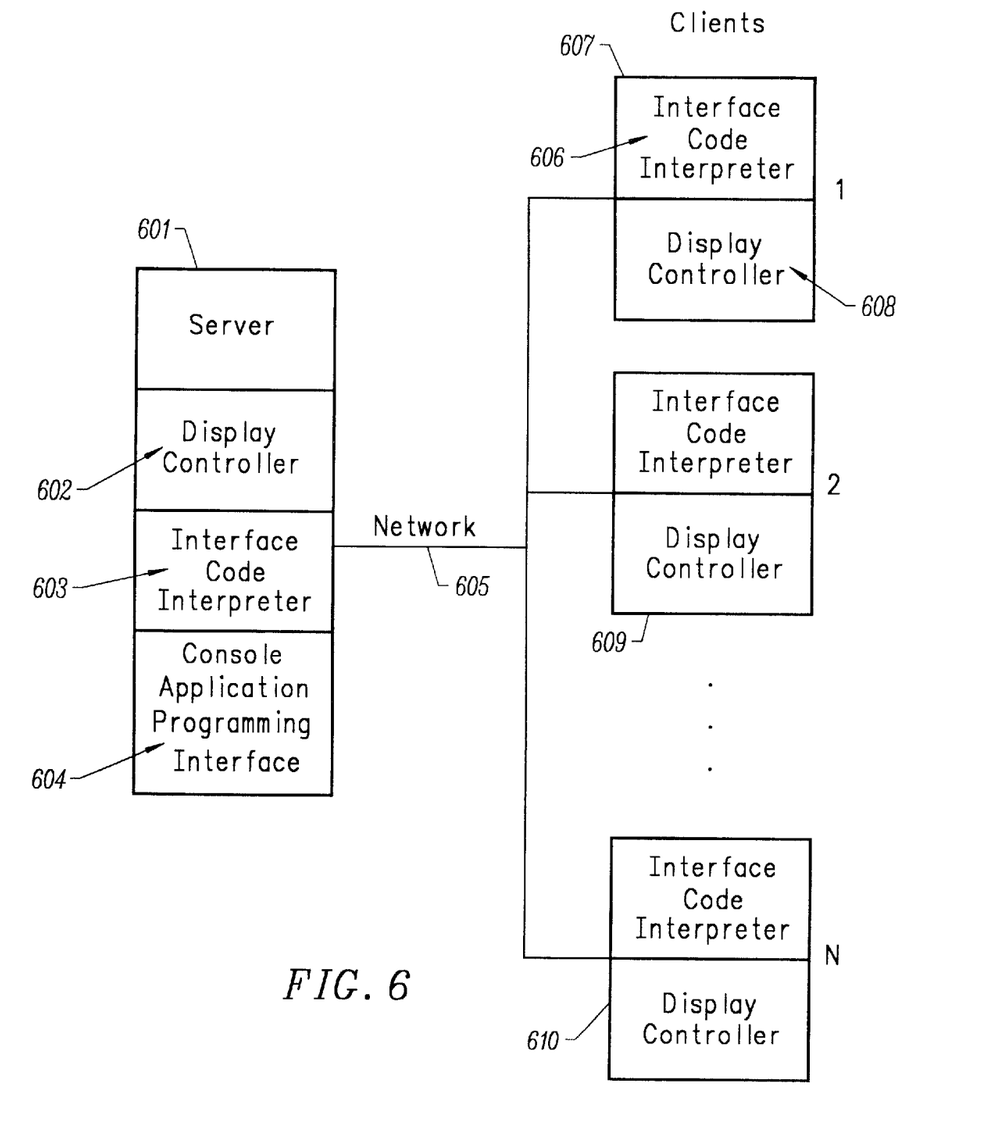
FIG. 6 is a block schematic diagram showing a local and remote implementation utilizing the server-client relationship according to the invention.

Referring to FIG. 6, the Server 601 may have a local display attached to it and would then require the Interface Code Interpreter 603 and the Display Controller 602 components. Each client (and Server 601 in this case) is normally communicating to a different user. Each user has different demands from the Server 601. Therefore, each client may have a different user interface screen displayed to the user. In addition, each client may have a different type of display. For example, client one 607, may have a GUI display, while client N 610 may have a five-line LCD display. This requires the clients to communicate to the Server 601 their display preferences, which is typically done upon the client startup or beginning of a communications session with the Server 601.

The Server 601 stores screen descriptions in a script form in an internal database. The scripts are created by the programmer and define the screen contents. The Server 601 interprets the scripts and converts it to the proper protocol form for a client to understand. The run-time interpretation of the scripts allows the programmer or OEM to create screen description scripts without re-compiling the source code of the Server 601. This also insulates the programmer and OEM from the internal structure of the Server 601 code and the language (e.g. C, Ada, C++) in which the code is written.

The Server 601 also stores display profile descriptions in an internal database. The client also has a requirement for the language, e.g. EnglishUS, that the client wants the strings and screens to be displayed in. The Server 601 tries to find the closest match to the client's profile and returns the profile handle. If the Server 601 does not find an exact string size match, it looks for a string size shorter than that requested. In the case of the language, it returns the default language, e.g. EnglishUS, if no match is found. The Server 601 ignores all unknown tags and unknown values from the client. The Server 601 dynamically creates a profile that matches the client's profile and returns the handle to that profile to the client. The client stores the profile handle and uses it to tell the Server 601 the types of screens and strings it requires. As previously mentioned, the client obtains a profile handle at the beginning of each communication session because the profile handles on the Server 601 may change.

The display profile descriptions are created by the software developer to indicate the capabilities of each type of display. Additionally, the server dynamically creates any additional display profiles to match the attributes of any previously unknown client profiles. A display may have the capability to display two lines of text (the smallest) or many lines of text (in the case of a GUI display). The CAPI system resizes the display output to fit the display type. CAPI operates on a multiple virtual LCD model, wherein the smallest display (two lines) constitutes a virtual LCD screen. Several LCD screens may be displayed on a five-line LCD. An even greater number (possibly ten) of LCD screens may be displayed on a GUI display. The software developer may coalesce the virtual LCDs into logical groupings so that multiple LCDs are logically related when they are displayed simultaneously.

Figure 7:
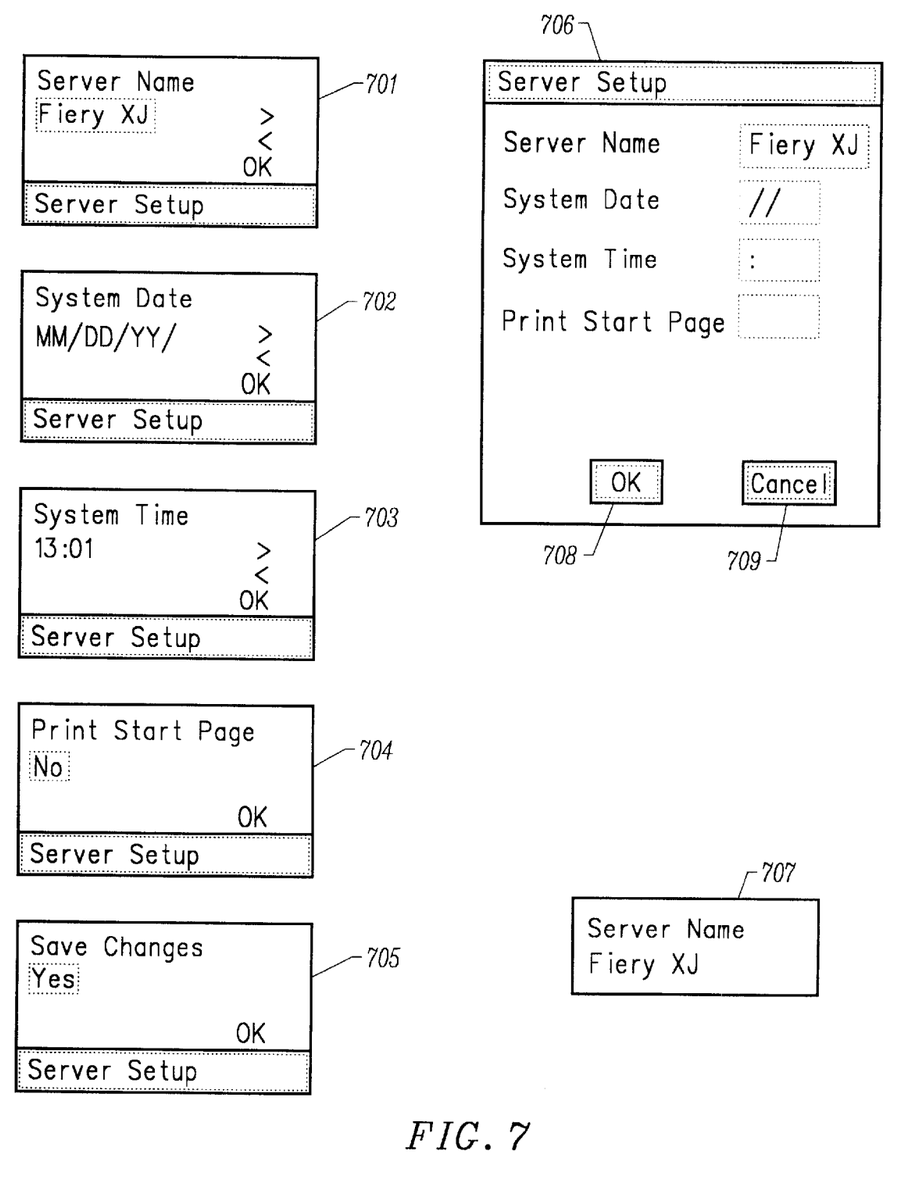
FIG. 7 is a block schematic diagram showing a series of screens and their equivalent translations in a GUI and LCD environment according to the invention.

With respect to FIG. 7, the coalescent behavior is shown using a series of server setup screens. A typical setup sequence allows the user to set the server name 701, system date 702, system time 703, whether to print a start page 704, and whether to save the changes made in the previous screens 705. A GUI display coalesces all of these screens onto one display 706, replacing the save changes screen 705 with an OK button 708 and a cancel button 709. The decision making process of whether to coalesce the screens resides in the client itself. The client has the knowledge of the capabilities of the display that it is driving. The server describes a vague, abstract grouping of the screens and the client decides on the final grouping. For a two-line LCD 707, the server name screen 701 would be reduced to two lines by the client.

Figure 8:
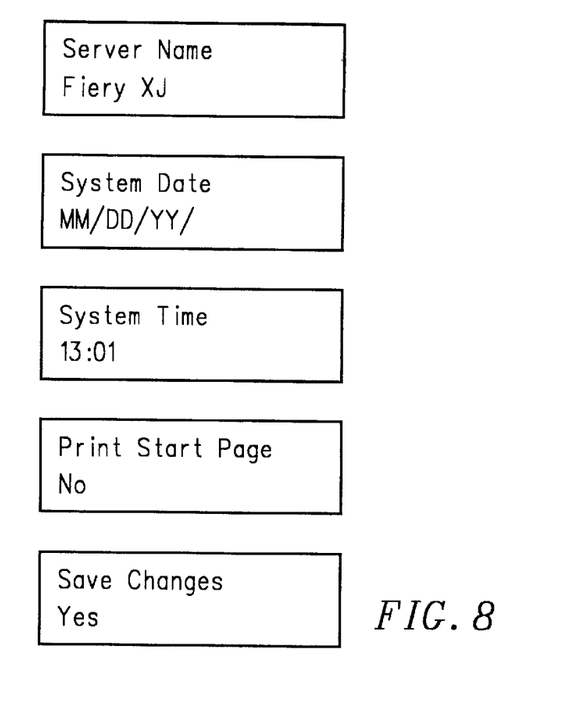
FIG. 8 is a block schematic diagram showing a series of two-line LCD displays.

Another concept that is brought about by the difference between a GUI and LCD display is that the amount of information that may be displayed on each display type varies. For example, a two-line LCD display (FIG. 8) may only have the ability to display a Raster Image Processor (RIP) screen containing the job name and number of bytes ripped. A GUI display (FIG. 10), on the other hand, adds more information such as the job's owner, the Postscript file size, and ripping time. This is called Variable Content.

In Variable Content, the server tags all of the contents of a run-time screen. The client picks and chooses which part of the contents of the screen it displays and which part it does not display. The decision is up to the client in customizing the contents according to the size of the display that it is driving. This results in a semi-chaotic interpretation of the screens. The advantage of this style of interpretation is that it allows the client to decide on the layout and attributes (e.g. font, size and color) of each screen. The outputs may vary between display types.

Figure 9:
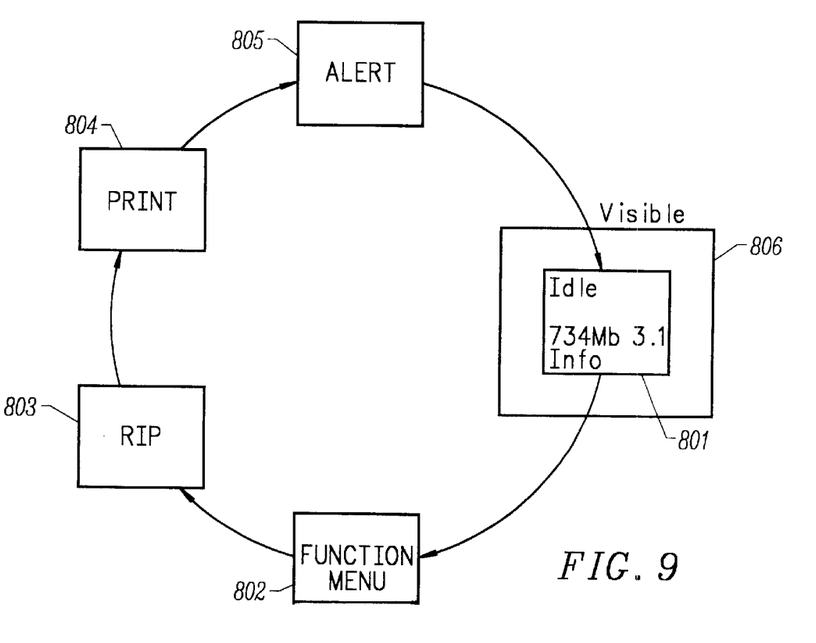
FIG. 9 is a block schematic diagram showing a sequence of LCD targets and their display sequence according to the invention.

Referring to FIG. 9, each type of screen is considered a target. An idle screen 801 is currently visible 806 in an LCD example. There are other targets that the user is able to scroll through, such as a function menu target 802, RIP target 803, print target 804, and alert target 805. The LCD targets are only active when there is information other than idle to display. An idle target display 801 indicates that all other targets are in an idle state.

Figure 10:
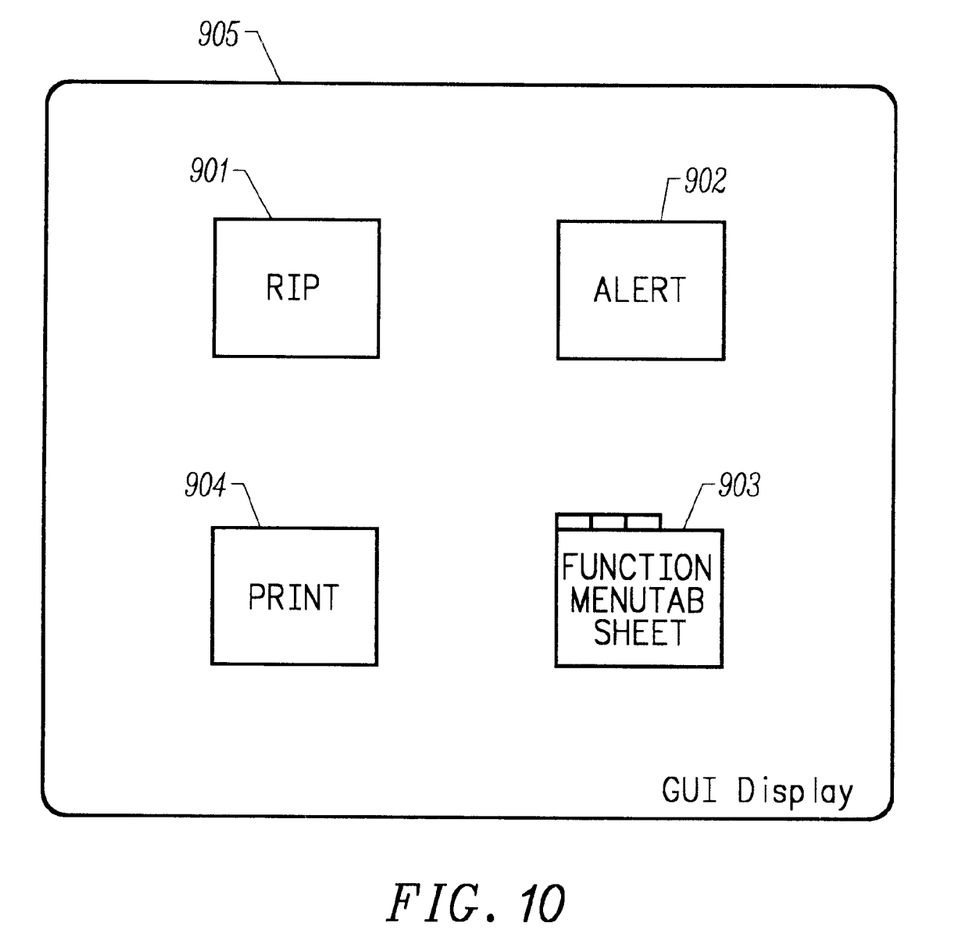
FIG. 10 is a block schematic diagram showing a set of GUI targets displayed simultaneously on a GUI display according to the invention.

With respect to FIG. 10, GUI targets are displayed on a GUI display 905. All targets such as the RIP target 901, alert target 902, function menutab sheet target 903, and print target 904 are visible. If any targets go into an idle state, then they indicate so. There is no need for a summary target as in the LCD example.

Input from the user can be predetermined on the client side. It is up to the client to decide at what level it pauses for user input. The server, on the other hand, does not know when an input event occurs.

In a preferred embodiment of the invention, CAPI allows the software developer to use a grammar that is a superset of the C programming language to create user interface screen descriptions. One skilled in the art will readily appreciate that other languages such as Ada, C++, and proprietary scripting grammars may be used instead of or in combination with C. The following is an example of a C based approach.

CAPI grammar (C based)

A sample code section is shown that demonstrates the similar structure of the CAPI grammar with the C language.

```
int
serverSetup (void)
{
   BEGIN(asscClusterSavable)
      BEGIN(textPair)
         moText("KSERVERNAME"); /* Server Name */
         moEntryText("XJ7_SERVER", NULL, 10);
      END
      BEGIN(datePair)
         moText("KSYSTEMDATE"); /* System Date */
         moEntryDate("sysdate");
      END
      BEGIN(timePair)
         moText("KSYSTEMTIME"); /* System Time */
         moEntryTime("systime");
      END
   END
   return CHOICE_NOTHING;
}
```

The inner BEGIN . . . END pairs represent small LCD screens, i.e. virtual LCD screens. While the outer BEGIN . . . END pair represents a group or cluster of small LCD screens.

The pairs and clusters may also be represented as a tree of array function pointers. A pair may be coded as one function, and a cluster function may contain code to register the function pointer of the pair. The function pointers are collected in an array and may be executed in any order.

For larger displays, such as GUI displays, these virtual LCD screens coalesce into dialog boxes. The inner BEGIN . . . END pairs represents lines in a dialog box. The outer BEGIN . . . END pair will represent a dialog box itself. The BEGIN . . . END Operators BEGIN . . . END pairs are implemented by means of macros in the C programming language. The following is a typical definition of the operators:

```
#define BEGIN(funPtr) \
   begin(funPtr); \
   {
#define END(funPtr) \
   }\
   end( );
```

The begin( ) function takes a function pointer as a parameter. Inside begin( ), the function pointer is de-referenced and called. The de-referenced function pointer performs some type of setup operation, then the function pointer is pushed onto a stack for end( ) to use later.

The end( ) function pops the function pointer off the stack and performs a table lookup for a corresponding ending function that describes how to shut down the code block.

The following is an example of an actual code section:

```
BEGIN(textPair)
. . .
END
```

BEGIN( ) starts and textPair( ) is called. TextPair( ) clears the screen and sends the cursor to the upper left hand corner of the screen. The function pointer textPair( ) is then pushed on the stack. END( ) executes later and the function pointer TextPair( ) is popped off of the stack. The function end( ) performs a table look up of textPair( ) to find the complement function. The function endTextPair( ) is found in the table. EndTextPair( ) is called and collects input from the user.

When BEGIN . . . END pairs are nested they form a cluster. A cluster is a grouping of smaller BEGIN . . . END pairs. On a GUI display, a cluster is equivalent to a dialog box.

The function pointers that are passed as parameters add to the flexibility of the system. For example, there are several functions with the suffix of Pairs in the previous examples. The functions textPair( ), datePair( ), and timePair( ) call a generic function called pair( ). This is an example of abstraction where a function can be customized for any special need.

The IF . . . ELSE . . . ENDIF Operators

The operators IF, ELSE, and ENDIF may be defined specifically to fit the application. For example:

define IF if define ELSE else define ENDIF /* nothing */

On other applications, IF and ELSE may be redefined to allow unconditional traversal of both branches of a conditional branch.

The BREAK Operator

The Break operator takes the program execution to the point just past the nearest END macro. Because the BEGIN and END macros may perform some behind the scenes operation, BREAK was developed to properly shut down those operations when trying to break out.

CAPI Screen Primitives

Screen primitives are identified by their prefix, mo (malleable output). They are named for reconfigurability. For example:

BEGIN(selectPair)
  moText("KPRTSTARTPG"); /* Print Start Page */
  moEntrySelect("PRTSTARTPG", "KYES", "KNO", NULL);
  /* Yes, No */
END The function mo Text( ) takes a language key parameter and outputs a localized string to the screen. MoEntrySelect( ) produces a selection choice list. The first value is a sysdict key that is used for obtaining a default value and writing back the value into the sysdict. The other strings are language keys whose localized form composes the choice list. The NULL designates the ending parameter in a variable argument list.

On any platform, the functionality of these mo functions can be rewritten allowing for arbitrary customization. For example, an application may want to redirect the output to more than one destination, e.g. multiple virtual LCDs or it may want to record a play back file. CAPI does not enforce any mo display. The exact form and appearance of display primitives is determined by the client application. CAPI only gives hints and suggestions of the form and appearance of primitives and selections.

CAPI Associative Primitives

In the previous examples, function pointers were passed into BEGIN. These function pointers are a class of primitives known as associatives. Associatives influence the behavior of mo primitives or nested BEGIN . . . END pairs. The mo functions are designed to be directed by associative primitives. The mo functions observe certain status set up by associatives and attempt to conform to them.

A second purpose of associatives is to perform implicit operations. For example, cluster associatives implicitly position a "save changes" screen at the end of a group of setup screens or an implicit OK button.

Associatives can also be rewritten for customization. For example, if a software developer is porting from a small screen LCD to a GUI display, the cluster associative is rewritten to create a dialog box instead of a series of screens. The pair associative is composed of two mo primitives to create a line within a dialog box.

The following is a description of a server/client communication protocol in a preferred embodiment of the invention.

Description of the Protocol

Instead of computing all of the layout details and managing all of the user controls on the server, CAPI offloads the User Interface (UI) interaction onto a client application (e.g. an LCD display client on the server, or remote applications written in Java). The client application communicates with CAPI using the protocol described herein.

CAPI can support remote applications on all platforms which understand the unified protocol. Multiple UI's of all varieties can be driven by a single protocol even though they differ in many ways.

The communication between the client application and CAPI server can be viewed as a request-response dialog. Each time the client application requires the next screen, it sends a screen request to CAPI and CAPI responds with the description of the next screen. The client must supply the handle of its current screen in the request. The protocol also pays attention to user input from the client application to CAPI, so the server can keep track of which screen to send at the next request. Possible requests include: next screen; previous screen; descent to next menu; and ascent from menu.

Values from the Parameter Manager are handled in the same manner. The client application sends a value request or a value save request and CAPI sends back a value response or a value save response.

Keys & Values

There is an associated key for each text string (both localized and non-localized), choice in selection lists, and screen (cluster or pair). This key is used by CAPI to identify all data and screens. Keys are also manipulated, stored, and retrieved by the Parameter Manager.

There are two parts to each key, the set key and the data key. Using dot notation, a key is in the form of S.D, where S is the set key and D is the data key.

CAPI has three types of values: string, numerical, and Boolean. Because the client has no information on localization, all strings sent to the client have to be prelocalized by the server. For example, when choosing a selection from a selection entry, the client must tell the server which choice it is setting. The client application sends back the key of the choice (e.g. true) rather than sending back the localized selection string (e.g. si (Spanish)).

For numerical values, there is no key associated with the value, and the client sends back the value.

Client Profile

Before the CAPI server can send back the description of screens or respond to any requests to the client application, the server must know what the client can display (i.e. whether the client is a two line LCD, five line LCD, or Java GUI application which can display long strings) and in which language the client wants the strings and screens to be. This is called the Client Profile.

The client application employs the following format in performing the client profile handshaking:

From client to server:

GETPROFILE#
Tag_\t_Value_\n_
Tag_\t_Value_\n_
...
Tag_\t_Value

From server back to client:

RETURNPROFILE#_\t_Profile_Handle

As an example, the tags can be lang and localSize. The value for the tag lang is the language that the client is trying to display, e.g. EnglishUS, French, or German. The value for the tag localSize tells the server the display size and whether the client is LCD or GUI, e.g. LCD5×20, LCD2×16, or GUI.

After the server receives the tags and values, it tries to lookup the closest match to the client profile and return the profile handle. If it does not find an exact string size match, it looks for a string size shorter than the requested one. In the case of language, it returns the default, e.g. EnglishIntl or EnglishUS, depending on the system. The server ignores all unknown tags and unknown values.

The Client Application then stores the Profile Handle and uses it in requesting screens and strings from the server. It is advisable not to hard code the profile handle or store it offline. The client application should perform the profile request every session (not every request though) because the profile handle might vary from different server versions.

Validity, Dependency and Propagation

Validity indicates whether a parameter's value is consistent with the correct operation of the system. For example, a negative value for a polling interval is invalid. Sometimes the user can only select from a few choices, making any other values invalid.

Dependency controls whether the user (an change the values in a certain entry. In the present protocol, dependency lists are sent to the client describing the dependency of an entry or a menu item.

Propagations are triggers which are activated when the user changes some values which cause "chain reactions." An example is when the user changes a value on the current page, thereby causing values in the pages encountered before and after to be changed.

Validity is maintained on LCD CAPI platforms using choice lists, numeric selection, range testing inside CAPI, and some programmatic C functions in the screen description files. Additionally, control flow dependency is used on LCD platforms rather than dependency lists. Therefore, CAPI skips the screen if the condition is not met.

Validity is the responsibility of the client application on GUI platforms. The protocol includes either all the possible choices (e.g. moEntrySelect) or the range of values the user can pick (e.g. moEntryNumber) for each entry. The client application validates the user input before sending it back to the server. Parameter Manager also validates the input on the server side.

GUI applications use dependency lists to deactivate (gray out) entries and tabsheets when certain conditions are not met. For example, when the Parallel Port is disabled, all of the configuration entries in the Parallel Port Setup page are deactivated.

Propagation is performed on the server side and not on the client side. Whenever propagation occurs, the server sends updates of the values to the client. The client is responsible for refreshing the display. The update is as follows:

UPDATE#\_\n_
Key_\t_Value
[_\n_Key_\t_Value . . . ]

Note: If the value of a selection is #??#, this indicates the client should erase the choice list. The #UPDATE# is immediately followed by a #RETURNOPTION# (the new choice list) with the corresponding key.

The update is easily performed if the client does not store any keys and values other than those currently displayed and the update does not affect the current page. When the client requests a new screen, the values in the new screen are up-to-date, so no special measures are required.

When the client application keeps track of keys and values, it changes the stored value in memory and refreshes the corresponding display upon receipt of the updates.

The most difficult part is when the update affects display and values of the current screen. This scenario requires Direct Mode or Component Level Event Driven.

Direct Mode

Direct Mode is similar to the "Wizard" in GUI environments. The application guides the user, one step at a time for each screen. Upon completing a change to one value or reading one message, the user can click on the NEXT button and go to the next step.

Propagation is easily achieved in direct mode because the client only receives one pair at a time. Therefore, propagation on the same screen does not occur. Also, flow control is totally controlled by the server, so no hiding or graying out of any components of the display is necessary.

Direct mode is activated by the "direct" tag in #SCREEN-RESPOND#. All client applications must support direct mode.

Component Level Event Driven (CLED)

During normal CAPI client-server interactions, the only time the client sends back requests is when the user is finished with the current screen and is trying to go to another screen. This is also the only time the client application is expecting anything from the server.

CLED differs from the normal situation. Each time the user changes anything or presses a button, the client sends back the value it is trying to set. The servers then send back the updates. This back-and-forth value exchange continues until the user is finished with the current screen, saves the values, and proceeds to the next screen.

CLED is activated by the "cled" tag in #SCREENRESPOND#.

Target Display Area

The server may occasionally send information, warning, and error messages to the client in addition to the regular screen display. The client application is responsible for displaying and distinguishing these messages from the regular display. For example, on a GUI application, the user may see an informational message on a pop-up dialog box and warning/error messages on another type of pop-up dialog box. While on an LCD display, the user presses a menu button to see a message on the information screen for informational messages, or presses the menu button again to see warnings and errors on alert screens with the warning LED flashing.

Each display area is referred to as a target. The client application supplies the target screen as a required parameter in each screen request. This tells the server the target for which the next screen description is intended. In each screen response, the server supplies a target tag so the client knows where to display the screen description. If there are any informational messages, warnings, or errors, the server sends two or more screen descriptions. All screen descriptions are directed to specified targets.

The message flash differs from all of the other targets. One example of a message flash is: "Configuring Token Ring Hardware. Wait 1 min." After receiving any message flash, the client application displays the message to the user and waits for the server to signal that it is ready again. The server also supplies a maximum timeout with the message flash target. If the client expires on this maximum timeout, it can send another screen request to the server. The client application considers the server to be down or the connection lost depending on the number of timeout expirations.

Details of the Protocol

The syntax of the protocol is covered in two sections. The first is the protocol from the client application to the server (CAPI) and the second is the protocol from the server (CAPI) back to the client.

Note: _\t_ denotes a TAB character and _\n_ denotes a NEWLINE character.

The TAB character is used as a delimiter for tokens on the same line, and the NEWLINE character is used to indicate the end of a token list. For debugging and readability, TAB characters are introduced at the beginning of a line to provide indentation. The client application ignores all of the TAB characters at the beginning of a line.

Client to Server (CAPI) Protocol

The Client initiates the request by first sending the Client Profile and other information to the server. After that information is sent, it can begin its request for screens.

IAM#_\t_Profile_Handle_\n_
[Tag_\t_Value_\n_ . . . Tag_\t_Value_\n_]
SCREENREQUEST#_\t_Target_Screen_\t_ScreenKey_\t_WhichScreen The "tag-value" list is optional and it provides a place for transferring extra information from the client to the server. The server ignores all unknown tags and values.

The keyword #IAM# requires one parameter, namely the Profile Handle, obtained from the Client Profile Request.

The #SCREENREQUEST# keyword has three parameters. The first parameter is the target screen of the client's primary target screen, e.g. setup, the second is a screen key of the current screen, and the third is a command for either previous or next, with respect to the screen key.

Besides screen requests, the client application can also request the following services:

Get Parameter Value: used to get a parameters current value.
GETVALUE#_\n_
key [_\t_key . . . ]

Set Parameter Value: set a parameter's current values.
SETVALUE#[_\t_tag]_\n_
key_\t_value [_\n_key_\t_value . . . ]
There is an optional tag field after #SETVALUE#. These tags include temp and cancel.

Get Parameter's Valid Options: obtain the valid options for the parameter and its default value.
GETOPTION#_\n_
_\t_key [_\n_key . . . ]

Get Parameter Information get parameter type, length, read/write etc.
GETINFO#_\n_
_\t_key [_\n_key . . . ]

Get Profile: get client profile handle for the closest matched supported localization and display.
GETPROFILE#_\n_
tag_\t_value [_\n_tag_\t_value . . . ]

Server (CAPI) to Client Protocol

The server side of the protocol are responses to the client's requests. The most common response is the #SCREENRESPOND#.

SCREENRESPOND#_\t_Target_Screen_\t_ScreenKey_\n_
[Tag_\t_Value_\n_ . . . Tag_\t_Value_\n_]
. . . Screen Description . . .

Tags include waitForServer (used with target mesgFlash), active, direct and cled.

waitForServer: parameter is in units of milliseconds.
parameter 0 means do not need to wait for server.
e.g. waitForServer 60000 means wait for server to get ready again, with a maximum timeout of 60000 milliseconds =1 minute.

active: true means show the display area if applicable, e.g. put up a pop up dialog box.
false means hide the target display area if applicable, e.g. take down a pop dialog box.

direct: true means direct mode is ON
false means direct mode is OFF.
If a #SCREENRESPOND# does not contain the direct tag,
it is defaulted to be false.

cled: true means CLED is ON
false means CLED is OFF.
If a #SCREENRESPOND# does not contain the cled tag,
it is defaulted to be false.

All client applications must support Direct Mode.

In the CAPI screen description, there are three layers: cluster, pair, and mo. Mo is the basic primitive, e.g. text label, entry box, selection list, checkbox, and buttons. A pair is a collection of two mo's, usually a text label and an entry component or display component. A cluster is a collection of pairs.

As disclosed above, CAPI does not enforce any mo display. The exact form and appearance of display primitives is determined by the client application. CAPI only gives hints and suggestions of the form and appearance of primitives and selections. This is also true for pair and cluster displays. CAPI only provides grouping hints and information. The client application can and is responsible in the actual layout of the components. The client application ignores and skips unknown clusters, pairs, and mo's.

A cluster corresponds to a group of related screens on LCD platforms, e.g. all the screens in a Server Setup submenu, or a single page on GUI-based platforms, e.g. a server setup dialog box.

AsscCluster is a regular cluster block, and asscCluster-Savable indicates a Save Screen or Save button is required when the user tries to exit the cluster.

Cluster Block::=
BEGIN#_\t_asscCluster | asscClusterSavable_\n_
. . .
END#_\n_
* '|' denotes OR in the syntax, i.e.
BEGIN#_\t_asscCluster_\n_ . . . #END#_\n_
-OR-
BEGIN#_\t_asscClusterSavable_\n_ . . . #END#_\n_

MenuScreen is a regular menu or tabsheet, and menuScreenSavable requires a save screen or Save button)
Menu Block::=
BEGIN#_\t_menuScreen | menuScreenSavable_\n_
. . .
END#_\n_

MesgScreen puts a message screen up with an "OK" button. The user needs to press the button before it proceeds to another screen. mesgFlashScreen is the same as mesgScreen with no "OK" button. It can be taken down by the system at any time. Currently, GUI applications get the message block description directed for a message target area.

Message Block::=
  #BEGIN#__\t__mesgFlashScreen | mesgScreen__\n__
  . . .
  #END#__\n__

A pair corresponds to a single screen on LCD platforms. On GUI platforms, a pair is usually a line in a dialog box.

Pair Block::=
  #BEGIN#__\t__datePair | timePair | ipPair | textPair | selectPair__\n__
  . . .
  #END#__\n__

ClusterTitle sets the title for the current cluster (which can contain several screens on LCD platforms or a single page on GUI-based platforms).

For LCDs, MoTitle sets the title for the current screen only. The title in the other screens in the same cluster are not changed. For GUIs, MoTitle is used to set the title of only the menu screen.

MoNoTitle is used when no title is desired in the current screen.

Cluster Title Statement::=
  clusterTitle__\n__
  Key__\t__Title String__\n__ moTitle Statement::=
  moTitle__\n__
  Key__\t__Title String__\n__ moNoTitle Statement::=
  moNoTitle__\n__

MoText puts up a text string on screen.
  moText Statement::=
    moText__\n__
    Key__\t__Text String__\n__

For each entry (query) and menu item, there may be a dependency list attached to it.

KeySignValue::=
  key ==value | key !=value

DependancyList::=
  #REQUIRES#__\t__BoolExp

BoolExpr::=
  KeySignValue | && BoolExpr BoolExp | || BoolExpr BoolExpr

MoEntry's are the primitives on the screen. Each moEntry is a query linked to a key. The key refers to data that can be manipulated by Parameter Manager.

moEntryDate Statement::=
  moEntryDate__\n__
  Key__\t__ValueString [__\t__DependancyList]__\n__
  FormatStringKey__\t__FormatString__\n__
    * FormatString is a combination of "MM", "DD", "YY" and delimiters, e.g. MM/DD/YY, DD.MM.YY, YY-MM-DD ValueString in the form of the format string using the same delimiters, e.g. 09/01/96, 01.09.96, 96-09-01
    FormatStringKey is the key of the FormatString. FormatString should be treated as another localized string in the language dictionary or in the Parameter Manager.

moEntryTime Statement::=
  moEntryTime__\n__
  Key__\t__ValueString [__\t__DependancyList]__\n__
  FormatStringKey__\t__FormatString__\n__
    * FormatString is a combination of "hh", "mm" and delimiters,
    e.g. hh:mm, hh.mm
    ValueString in the form of the format string using the same delimiters, e.g. 00:01, 16.30
    FormatStringKey is the key of the FormatString. FormatString should be treated as another localized string in the language dictionary or in the Parameter Manager.

moEntryIP Statement::=
  moEntryIP__\n__
  Key__\t__ValueString [__\t__DependancyList]__n__
    * ValueString in the form of #.#.#.# where # can be from 0 to 255 e.g. 125.0.11.2 moEntryNumber Statement::=
  moEntryNumber__\n__
  Key__\t__ValueString [__\t__DependancyList]__\n__
  Range
    * ValueString (integer string, can be positive, zero or negative)
    * Each Range has the format
    Lower bound [. . . Higher bound [@ Step]], and multiple ranges are separated by commas ",".

moEntryText Statement::=
  moEntryText__\n__
  Key [__\t__ValueString] [__\t__DependancyList]__\n__
  Maximum Length (integer string, must be positive)__\n__
    * ValueString is the default text, can be empty.

moEntryTextSecret (Password) Statement::=
  moEntryTextSecret__\n__
  Key [__\t__ValueString] [__\t__DependancyList]__\n__
  Maximum Length (integer string, must be positive)__\n__
    * ValueString is the default text, can be empty.

moEntrySelect Statement::=
  moEntrySelect__\n__
  Key [__\t__ValueString] [__\t__DependancyList]__\n__
  ChoiceList
    * ValueString is the choice key. If left empty, the first choice will be used as the default value.

ChoiceList::=
  Key__\n__Value
  [__\t__Key__\t__Value . . . ]

moEntryToggle Statement::=
  Same as moEntrySelect Statement.
    * moEntryToggle is similar to moEntrySelect. moEntrySelect can be realized as a selection list (option list/list box widget), while a moEntryToggle can be realized as a checkbox or radiobox (radio buttons) primitive. However, the difference is just given as a hint to the client application, which still has the final decision in how to display the screen.

MoMenuItem is a link to further screens in the menu screen.

On a GUI platform, a menu is realized in two ways, either a row/column of buttons or a tabsheet (property sheet). The choice is determined by the GUI application.

moMenuItem Statement::=
  moMenuItem [__\t__DependancyList]__\n__
  Key__\t__Menu Item String__\t__

Besides the screen description, the protocol covers other request-respond communications.

Respond to Get Parameter Value (#GETVALUE#):

return the parameter's current value.
    #RETURNVALUE#__\n__
    Key__\t__Value [__Key__\n__Value . . . ]
Respond to Set Parameter Value (#SETVALUE#):
tell the client application if the values are set
    #SETRESPOND#__\n__
    Key__Flag__Value
    [__\t__Key__\t__Flag__\n__Value . . . ]
        Value is the current value, so if the set request fails, the client can show the current value.
        The flag is an integer where 0 indicates the value is set, and other number is error status (for debugging purpose only).
        The server may send #SCREENRESPOND# to different targets, e.g. info, warning or error messages, before #SETRESPOND#.
Respond to Get Parameter's Valid Options (#GETOPTION#):
return the parameter's valid options and the default value. The options are the current set allowable values based on information provided by Parameter Manager.
    #RETURNOPTION#__\n__key__\t__
    Default__Value [__Option . . . ]
    [__\t__#RETURNOPTION#__\t__key__\n__Default__
    Value [__\t__Option . . . ] . . . ]
Note: The first option returned is the default value. The number of options vary, depending on what is active on the server. Also, each #RETURNOPTION# contains only ONE key. Therefore, one #GETOPTION# request can result in more than one #RETURNOPTION# response.
Respond to Get Parameter Information (#GETINFO#):
return the parameters information.
    #RETURNINFO#__\n__
    key__\n__tag__\t__value [__\t__tag__\n__value . . . ]
    [__\t__key__\t__tag__\t__value [__\t__tag__\n__value . . . ] . . . ]
        Tags include type, length, read, write, usertype.
        Value corresponds to each tag, e.g. length 4, type U8, usertype date.
Respond to Get Profile (#GETPROFILE#):
return the closest matched client profile handle.
    #RETURNPROFILE#__Profile__Handle
Propagation Value Update
    #UPDATE#__\n__
    key__\t__value
    [__\t__key__\n__value . . . ]
Note: If the value of a selection is #??#, this indicates the client should erase the choice list. The #UPDATE# will be immediately followed by a #RETURNOPTION# (the new choice list) with the corresponding key.
Control Panel Map Generator A control panel map is a map of all of the LCD screens. Clients have the power to traverse pairs and clusters. Usually traversal is initiated by the user. Unlike user initiated traversal, a control panel map generator unconditionally traverses all of the links to assemble a map of all of the LCD screens. This is very useful for the creation of documentation.

Due to the organization of the server and client, any changes or additions to screens on the server results in the update of only the server software. The client has no knowledge of the number of screens that exist on the server, only that it has a screen handle from the server.

One skilled in the art can readily appreciate that these techniques can be applied in a different manner in relation to the server and the client. For example, the client's Interface Code Interpreter stores the display profile descriptions in an internal database. The server sends the client generic screen descriptions in response to the clients requests. The client uses the display profile that fits its display type to translate the generic screen description and display the screen to the user.

The generic construction of the invention allows the software developer to create a single software code base that is compatible with all possible display types. This results in a labor, time, and maintenance savings. Additionally, the generic constructs allow an OEM to create user interface screens without requiring any knowledge of the product's software architecture.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for displaying user interface screens on a plurality of dissimilar display devices using a unified interface expression, comprising the steps of:

creating a list of generic user interface screen descriptions at a server;

identifying the display type associated with a client; and updating a client display using said generic user interface screen descriptions;

wherein said client and server may optionally be co-located.

2. The process of claim 1, further comprising the steps of:

creating a list of display type profiles at said server; and selecting the appropriate display type profile from said display type list that is the closest equivalent to said client's display type profile;

wherein said updating step sends said generic interface screen descriptions to said client according to said selected display type profile.

3. The process of claim 1, further comprising the step of:

creating a list of supported language types at said server.

4. The process of claim 3, further comprising the steps of:

selecting the appropriate language type from said language type list that is the closest equivalent to said client's language type; and configuring said generic screen descriptions to match said selected language type.

5. The process of claim 3, further comprising the steps of:

converting said generic screen descriptions into protocol screen descriptions;

selecting the appropriate language type from said language type list that is the closest equivalent to said client's language type; and configuring said protocol screen descriptions to match said selected language type.

6. The process of claim 1, further comprising the step of:

responding to a client's screen request by sending the appropriate generic screen description to said client.

7. The process of claim 6, further comprising the step of:

sending the key value corresponding to said appropriate generic screen description to said client.

8. The process of claim 1, further comprising the step of:

responding to a client's request for a system parameter value by sending an appropriate system parameter value to said client.

9. The process of claim 1, further comprising the step of:
updating the appropriate system parameter value with a value sent by a client.

10. The process of claim 1, further comprising the step of:
responding to a client's screen request by sending an appropriate generic screen description to said client through a network.

11. The process of claim 10, further comprising the step of:
sending a key value corresponding to said appropriate generic screen description to said client through a network.

12. The process of claim 1, further comprising the step of:
responding to a client's request for a system parameter value by sending an appropriate system parameter value to said client through a network.

13. The process of claim 1, wherein said generic user interface screen descriptions are created in such a manner as to allow each screen to be displayed on any one of said dissimilar display devices.

14. The process of claim 1, further comprising the steps of:
creating a list of display type profiles at said client;
selecting the appropriate display type profile from said display type list that is the closest equivalent to said client's display type profile;
receiving said generic interface screen descriptions from said server; and
displaying said screen descriptions to a user using said selected display type profile to interpret said screen descriptions.

15. The process of claim 1, further comprising the steps of:
receiving said generic interface screen descriptions on said client from said server; and
displaying said generic interface screen descriptions on said client to a user by combining said screen descriptions to accommodate the display capability of the display type attached to said client.

16. The process of claim 1, further comprising the steps of:
receiving said generic interface screen descriptions on said client from said server; and
displaying said generic interface screen descriptions on said client to a user by displaying as much of the contents of said screen descriptions to accommodate the display capability of a display type attached to said client.

17. The process of claim 1, further comprising the steps of:
converting said generic screen descriptions into protocol screen descriptions.

18. The process of claim 17, further comprising the steps of:
creating a list of display type profiles at said server; and
selecting the appropriate display type profile from said display type list that is the closest equivalent to said client's display type profile;
wherein said updating step sends said protocol screen descriptions to said client according to said selected display type profile.

19. The process of claim 17, further comprising the step of:
responding to a client's screen request by sending the appropriate protocol screen description to said client.

20. The process of claim 19, further comprising the step of:
sending the key value corresponding to said appropriate protocol screen description to said client.

21. The process of claim 17, further comprising the step of:
responding to a client's screen request by sending the appropriate protocol screen description to said client through a network.

22. The process of claim 21, further comprising the step of:
sending a key value corresponding to said appropriate protocol screen description to said client through a network.

23. The process of claim 17, wherein said protocol screen descriptions are created in such a manner as to allow each screen to be displayed on any one of said dissimilar display devices.

24. The process of claim 17, further comprising the steps of:
creating a list of display type profiles at said client;
selecting the appropriate display type profile from said display type list that is the closest equivalent to said client's display type profile;
receiving said protocol screen descriptions from said server; and
displaying said protocol screen descriptions to a user using said selected display type profile to interpret said screen descriptions.

25. The process of claim 17, further comprising the steps of:
receiving said protocol screen descriptions on said client from said server; and
displaying said protocol screen descriptions on said client to a user by combining said screen descriptions to accommodate the display capability of the display type attached to said client.

26. The process of claim 17, further comprising the steps of:
receiving said protocol screen descriptions on said client from said server; and
displaying said protocol screen descriptions on said client to a user by displaying as much of the contents of said screen descriptions to accommodate the display capability of the display type attached to said client.

27. The process of claim 1, further comprising the step of:
providing a direct mode of operation in which certain user actions are communicated directly to said server.

28. The process of claim 1, further comprising the step of:
providing a component level event driven mode of operation in which all user actions are communicated directly to said server.

29. An apparatus for displaying user interface screens on a plurality of dissimilar display devices utilizing a unified interface protocol, comprising:
a console application programming interface located on a server;
said console application programming interface comprising a list of generic user interface screen descriptions; and
said console application programming interface comprising a module for updating a client display using said generic user interface screen descriptions.

30. The apparatus of claim 29, said console application programming interface further comprising:

a list of display type profiles;

a module for selecting the appropriate display type profile from said display type list that is the closest equivalent to said client's display type profile; and wherein said updating module sends said generic interface screen descriptions to said client according to said selected display type profile.

31. The apparatus of claim 29, said console application programming interface further comprising:

a list of supported language types.

32. The apparatus of claim 31, said console application programming interface further comprising:

a module for selecting the appropriate language type from said language type list that is the closest equivalent to said client's language type; and a module for configuring said generic screen descriptions to match said selected language type.

33. The apparatus of claim 31, said console application programming interface further comprising:

a module for converting said generic screen descriptions into protocol screen descriptions;

a module for selecting the appropriate language type from said language type list that is the closest equivalent to said client's language type; and a module for configuring said protocol screen descriptions to match said selected language type.

34. The apparatus of claim 29, said console application programming interface further comprising:

a module for responding to a client's screen request by sending the appropriate generic screen description to said client.

35. The apparatus of claim 34, said console application programming interface further comprising:

a module for sending the key value corresponding to said appropriate generic screen description to said client.

36. The apparatus of claim 29, said console application programming interface further comprising:

a module for responding to a client's request for a system parameter value by sending the appropriate system parameter value to said client.

37. The apparatus of claim 29, said console application programming interface further comprising:

a module for updating the appropriate system parameter value with the value sent by a client.

38. The apparatus of claim 29, said console application programming interface further comprising:

a module for responding to a client's screen request by sending the appropriate generic screen description to said client through a network.

39. The apparatus of claim 38, said console application programming interface further comprising:

a module for sending the key value corresponding to said appropriate generic screen description to said client through a network.

40. The apparatus of claim 29, said console application programming interface further comprising:

a module for responding to a client's request for a system parameter value by sending the appropriate system parameter value to said client through a network.

41. The apparatus of claim 29, wherein said generic user interface screen descriptions are structured to allow each screen to be displayed on any one of said dissimilar display devices.

42. The apparatus of claim 29, further comprising:

an interface code interpreter located on said client;

said interface code interpreter comprising a list of display type profiles;

said interface code interpreter comprising a module for selecting the appropriate display type profile from said display type list that is the closest equivalent to said client's display type profile;

said interface code interpreter comprising a module for receiving said generic interface screen descriptions from said server; and said interface code interpreter comprising a module for displaying said screen descriptions to a user using said selected display type profile to interpret said screen descriptions.

43. The apparatus of claim 29, further comprising:

an interface code interpreter located on said client;

said interface code interpreter comprising a module for receiving said generic interface screen descriptions from said server; and said interface code interpreter comprising a module for displaying said generic interface screen descriptions on said client to a user by combining said screen descriptions to accommodate the display capability of the display type attached to said client.

44. The apparatus of claim 29, further comprising:

an interface code interpreter located on said client;

said interface code interpreter comprising a module for receiving said generic interface screen descriptions from said server; and said interface code interpreter comprising a module for displaying said generic interface screen descriptions on said client to a user by displaying as much of the contents of said screen descriptions to accommodate the display capability of the display type attached to said client.

45. The apparatus of claim 29, said console application programming interface further comprising:

a module for converting said generic screen descriptions into protocol screen descriptions.

46. The apparatus of claim 45, said console application programming interface further comprising:

a list of display type profiles; and a module selecting the appropriate display type profile from said display type list that is the closest equivalent to said client's display type profile;

wherein said updating module sends said protocol screen descriptions to said client according to said selected display type profile.

47. The apparatus of claim 45, wherein said protocol screen descriptions are created in such a manner as to allow each screen to be displayed on any one of said dissimilar display devices.

48. The apparatus of claim 45, further comprising:

an interface code interpreter located on said client;

said interface code interpreter comprising a list of display type profiles;

said interface code interpreter comprising a module for selecting the appropriate display type profile from said display type list that is the closest equivalent to said client's display type profile;

said interface code interpreter comprising a module for receiving said protocol screen descriptions from said server; and said interface code interpreter comprising a module for displaying said protocol screen descriptions to a user using said selected display type profile to interpret said screen descriptions.

49. The apparatus of claim 45, further comprising:

an interface code interpreter located on said client;

said interface code interpreter comprising a module for receiving said protocol screen descriptions from said server; and said interface code interpreter comprising a module for displaying said protocol screen descriptions on said client to a user by combining said screen descriptions to accommodate the display capability of the display type attached to said client.

50. The apparatus of claim 45, further comprising:

an interface code interpreter located on said client;

said interface code interpreter comprising a module for receiving said protocol screen descriptions from said server; and said interface code interpreter comprising a module for displaying said protocol screen descriptions on said client to a user by displaying as much of the contents of said screen descriptions to accommodate the display capability of the display type attached to said client.

51. The apparatus of claim 29, said console application programming interface further comprising:

a module for responding to a client's screen request by sending the appropriate protocol screen description to said client.

52. The apparatus of claim 51, said console application programming interface further comprising:

a module for sending the key value corresponding to said appropriate protocol screen description to said client.

53. The apparatus of claim 29, said console application programming interface further comprising:

a module for responding to a client's screen request by sending the appropriate protocol screen description to said client through a network.

54. The apparatus of claim 53, said console application programming interface further comprising:

a module for sending the key value corresponding to said appropriate protocol screen description to said client through a network.

55. The apparatus of claim 29, wherein a direct mode is provided in which certain user actions are communicated directly to said server.

56. The apparatus of claim 29, wherein a component level event driven mode is provided in which all user actions are communicated directly to said server.

* * * * *